United States Patent [19]

O'Neill et al.

[11] 4,304,901
[45] Dec. 8, 1981

[54] WATER DISSIPATABLE POLYESTERS

[75] Inventors: George J. O'Neill; Stephen N. Belote, both of Kingsport, Tenn.

[73] Assignee: Eastman Kodak Company, Rochester, N.Y.

[21] Appl. No.: 144,512

[22] Filed: Apr. 28, 1980

[51] Int. Cl.$^3$ .............................................. C08G 63/68
[52] U.S. Cl. ............................ 528/290; 260/29.2 E; 528/291; 528/292
[58] Field of Search .................. 528/290, 291, 292; 260/29.2 E

[56] References Cited

U.S. PATENT DOCUMENTS 4,145,469 3/1979 Newkirk et al. .................... 428/245
4,156,073 5/1979 Login ................................. 528/29

Primary Examiner—Lucille M. Phynes
Attorney, Agent, or Firm—John F. Stevens; Daniel B. Reece, III

[57] ABSTRACT

Disclosed are linear, water-dissipatable polyesters and polyesteramides derived from at least one dicarboxylic acid, at least one glycol, and at least one polycarboxylic acid or polyhydric alcohol which contains a sulfonic acid salt moiety derived from a nitrogen-containing base having an ionization constant in water at 25° C. of $10^{-3}$ to $10^{-10}$. The polyesters may also contain an unsaturated acid and a difunctional hydroxycarboxylic acid, an aminocarboxylic acid or a diamine. Such polymers are especially useful as adhesives, coatings, films and the like.

22 Claims, No Drawings

WATER DISSIPATABLE POLYESTERS

DESCRIPTION

1. Technical Field

This invention relates to water-dissipatable polyesters and polyesteramides wherein at least a part of one of the monomeric components from which it is derived is a polycarboxylic acid or polyhydric alcohol which contains a sulfonic acid salt moiety derived from a nitrogen-containing base having an ionization constant in water at 25° C. of $10^{-3}$ to $10^{-10}$. These polymers are useful as adhesives, coatings, films and the like.

2. Background Art

Water-dissipatible polyesters and polyesteramides are known in the art. For example, U.S. Pat. No. 3,734,874 relates to such polymers prepared by reacting a glycol component, a dicarboxylic acid component, and at least one difunctional comonomer wherein a portion of the comonomer contains a sulfonate group in the form of a metallic salt, the sulfonate salt group being attached to an aromatic nucleus.

Another patent of interest is U.S. Pat. No. 3,546,180, which discloses disulfonamido compounds incorporated into polyester molecules for improving the dyeability of polyester shaped articles such as fibers and films. Other patents of interest include U.S. Pat. Nos. 3,563,942, 3,546,008; 4,073,77 and 4,104,262, and Research Disclosure No. 18,569 of Sept., 1979.

DISCLOSURE OF INVENTION

This invention provides a linear water-dissipatable polymer having carbonyloxy interconnecting groups in the structure in which up to 80% may be carbonylamido linking groups. This polymer has an inherent viscosity of at least 0.1 and preferably at least 0.3 and comprises the following:

(1) at least one dicarboxylic acid,
(2) at least one glycol, and
(3) an amount sufficient to provide the polymer at least water-dissipatable, dispersible, or soluble of at least one polycarboxylic acid or polyhydric alcohol which contains a sulfonic acid salt moiety derived from a nitrogen-containing base having an ionization constant in water at 25° C. of $10^{-3}$ to $10^{-10}$, mixtures thereof or mixtures with alkali metal.

In addition, the polymer may contain an unsaturated mono- or dicarboxylic acid and/or from none to an amount of a difunctional hydroxycarboxylic acid having one —CR₂OH group, an aminocarboxylic acid having one —NRH group, a diamine having two —NRH groups, or a mixture thereof, where each R is an H atom or a 1-4 carbon alkyl group.

Acids which may be used include the aliphatic dibasic acids or esters thereof of the formula $$R^{10}OOC-R^{11}-COOR^{12}$$

wherein $R^{10}$ and $R^{12}$ are either hydrogen or alkyl radicals containing from 1 to 10 carbon atoms, and $R^{11}$ is an aliphatic hydrocarbon radical. Typical aliphatic dibasic dicarboxylic acids which can be employed include oxalic acid, succinic acid, adipic acid, sebacic acid, α,α-dimethyl glutaric acid, dimethyl malonic acid, diglycollic acid, β-oxydipropionic acid, -oxydibutyric acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

Aromatic dicarboxylic acids or diesters thereof may be advantageously used. Such acids have the formula $R^{10}OOCR^{13}-Y-R^{14}COOR^{12}$ wherein $R^{10}$ and $R^{12}$ are the same as defined above and $R^{13}$ and $R^{14}$ each represents $(-CH_2-)_{n-1}$ wherein n has a value of from 1 to 5 inclusive and Y represents a divalent aromatic radical of the formula

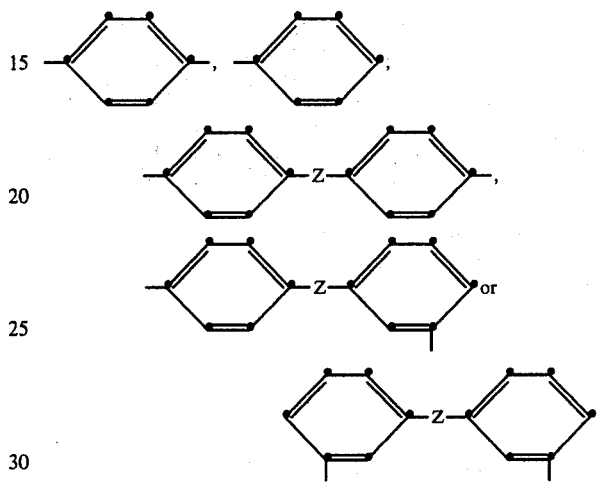

Z representing a radical of the formula $-(CH_2)_{n-1}-$;

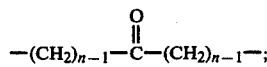

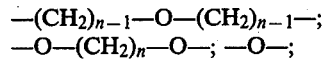

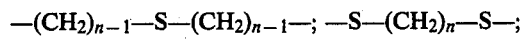

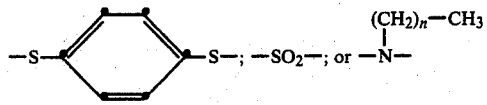

Examples of such acids include p,p'-sulfonyldibenzoic acid, 2,7-naphthalene dicarboxylic acid, terephthalic acid, 1,2-di(p-carboxyphenoxy)ethane, 1,2-di(p-carboxyphenyl)ethane, 1,2-di(p-carboxyphenoxy)ethane and p,p'-di-phenic acid. The preferred acid is isophthalic acid.

It should be understood that use of the corresponding acid anhydrides, esters, and acid chlorides of these acids is included in the term "dicarboxylic acid". Examples of these esters include dimethyl 1,4-cyclohexanedicarboxylate; dimethyl 2,6-naphthalenedicarboxylate; dibutyl 4,4'-sulfonyldibenzoate; dimethyl isophthalate; dimethyl terephthalate; and diphenyl terephthalate. Copolyesters may be prepared from two or more of the above dicarboxylic acids or derivatives thereof.

The glycol component may be at least one polyoxyethylene glycol (polyethylene glycol) having a molecular weight of from about 100 to about 1000. Examples of suitable poly(ethylene glycols) include diethylene glycol, triethylene glycol, tetraethylene glycol, and pentaethylene, hexaethylene, heptaethylene, octaethylene, nonaethylene, and decaethylene glycols, and mixtures thereof. Preferably the poly(ethylene glycol) employed in the polyesters or polyesteramides of the present invention is diethylene glycol or triethylene glycol or mixtures thereof. The remaining portion of the glycol component may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

The glycol component may also be glycols having the formula

HO—(CH$_2$)$_n$—OH where n is an integer from 2 to 12.

It is preferred that if high molecular weight polymers, e.g., 10,000–12,000 are used, at least a part of the glycol be a polyethylene glycol. On the other hand, if the polymer is branched and has a relatively low molecular weight, (e.g., 1,200) the glycol may contain little or no polyethylene glycol.

The polymer according to this invention contains at least one polycarboxylic acid or polyvalent alcohol containing a sulfonic acid salt moiety derived from a nitrogen-containing base.

The difunctional sulfo-monomer component of the polyester or polyesteramide may advantageously be a dicarboxylic acid or an ester thereof containing a nitrogen-based cation sulfonate group or a glycol containing a nitrogen-based cation sulfonate group. Based on the mole percent of acid or glycol, from about 5 to about 20, preferably about 8 to about 15 mole percent of such acid or glycol may be used.

Advantageous difunctional sulfo-monomer components are those wherein the sulfonate salt group is attached to an aromatic acid nucleus such as a benzene, naphthalene, diphenyl, oxydiphenyl, sulfonyldiphenyl, or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate having the general formula:

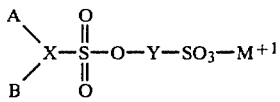

wherein X is a trivalent aromatic radical derived from a substituted or unsubstituted aromatic hydrocarbon, Y is a divalent aromatic radical derived from a substituted or unsubstituted aromatic hydrocarbon, A and B are carboalkoxy groups containing 1 to 4 carbon atoms in the alkyl portion or a carboxy group, M is a nitrogen-based cation.

If it is desired to introduce the sulfo group containing the nitrogen-based cation as a component of a bivalent alcohol the following compounds are particularly contemplated for such purpose: 2-sulfo butanediol, sulfo-m-(p-) xylene glycol, oxyalkylated sulfonoited dihydric phenols, naphtholes (e.g., oxyalkylated chromotropic acid) and similar compounds, such as (-oxymethyl-tetramethylene sulfonat-1,3-($\beta$-sulfoethoxy)-1,2-propanediol of the reaction products of 1,3 propane sultone and polyalkohols described in GB-P 1151569.

The nitrogen-containing bases from which the sulfonic acid salt is derived may be aliphatic, cycloaliphatic or aromatic basic compounds that have ionization constants in water at 25° C. of $10^{-3}$ to $10^{-10}$, preferably $10^{-5}$ to $10^{-8}$. Especially preferred are ammonia, dimethylethanolamine, diethanolamine, triethanolamine, pyridine, morpholine, and piperidine.

Should crosslinking with another monomer be desired, unsaturated acids may be used to crosslink with the unsaturation in the polyester. For example, an unsaturated acid may be used with a monomer, and a free radical initiating catalyst such as radiation or peroxide may be used. The $\alpha,\beta$-unsaturated acids are described by the following structure:

R—CH=CH—R$^1$ wherein R is H, alkylcarboxy, or arylcarboxy and R$^1$ is carboxy or arylcarboxy. Polymers derived from the above components can be used in combination with polymers derived from other components and/or in combination with other ethylenically unsaturated comonomers (e.g., acrylic acid, acrylamide, butyl acrylate, diacetone acrylamide). The comonomers can be from 1–75 parts by weight, preferably 5–25 parts by weight.

From none to about 80 mole percent of a difunctional hydroxycarboxylic acid having one —CH$_2$—OH group, an aminocarboxylic acid having one —NRH group, an amino-alcohol having one —CR$_2$—CH group and one —NRH group, a diamine having two —NRH groups, or a mixture thereof, wherein each R is an H atom or a 1-4 carbon alkyl group may also be included. The components being organic compounds, each of which contains a hydrocarbon moiety which has from none up to six nonfunctional groups, and where (1) the difunctional dicarboxylic acid represents all of the carboxy functional groups in said polymer from all of said components and (2) the difunctional glycol represents all of the functional hydroxy and functional amino groups in the polymer from all of said components, the ratio of (1) to (2) in the polymer is substantially unity, whereby the polymer is essentially linear. According to one aspect of this invention, there is provided a polymer which is a polyester wherein the difunctional sulfomonomer is a dicarboxylic acid and constitutes about 6 mole percent to about 20 mole percent based on the sum of (1) the moles of the total dicarboxylic acid content of components (1) and (2), and (2) one half of the moles of any hydroxycarboxylic acid content from this difunctional hydroxycarboxylic acid component.

Difunctional amide compounds may also be incorporated into the polyester backbone to form polyesteramides, for example, to enhance adhesion to nylon. Advantageous difunctional components which are aminoalcohols include aromatic, aliphatic, heterocyclic and other types. Specific examples include 5-aminopentanol-1,4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —CR$_2$—OH group.

Such difunctional monomer components which are aminocarboxylic acids include aromatic aliphatic, heterocyclic, and other types and include lactams. Specific examples include 6-aminocaproic acid, its lactam known as caprolactam, omega-aminoundecanoic acid, 3-amino-2-dimethylpropionic acid, 4-(β-aminoethyl)-benzoic acid, 2-(β-aminopropoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Examples of such difunctional monomers which are diamines include ethylenediamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodecamethylenediamine, etc. From none, up to about 80 mole percent, based on 100 mole percent acid, of this difunctional component may be used.

Whenever the term "inherent viscosity" (I.V.) is used in this description, it will be understood to refer to viscosity determinations made at 25° C. using 0.25 gram of polymer per 100 ml. of a solvent composed of 60 percent phenol and 40 percent tetrachloroethane as parts by weight. In addition, whenever the terms "dissipatable," "dissipated" or "dissipate" are used in this description, it will be understood to refer to the activity of a water, aqueous or caustic aqueous solution on the polymer. The terms are specifically intended to cover those situations wherein the solution dissolves and/or disperses the polyester or polyesteramide therein and/or therethrough. Furthermore, whenever the word "water" is used in this description, it includes not only aqueous solutions but also hot aqueous solutions and caustic aqueous solutions.

The polyesters and polyesteramides of this application have particular utility in the coatings, textile finishes and adhesives which will dissipate and can be applied to a substrate in aqueous or caustic aqueous solutions. In many operations, it is advantageous to apply the aqueous solutions and dry the coated substrate. In addition, the present polyesters and polyesteramides have utility as hot-melt adhesives for paper, cloth, polyester film and other substrates.

Additional uses are disclosed in Shields, Hawkins and Wooten U.S. Pat. No. 3,456,008 entitled "Sizing Compositions and Fibrous Articles Sized Therewith."

Because monomers containing the nitrogen-based sulfonate salts are not thermally stable at conditions required to make the polymers in the melt, the method of this invention for preparing polyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

Thus, the polymer containing the required amount of sulfonate group in the from of its alkali metal salt in water is prepared according to known procedures. For example, the sulfonate-containing monomer modifier may be added directly to the reaction mixture from which the polymer is made. Thus, these monomer modifiers can be used as a component in the original polymer reaction mixture. Other various processes which may be employed in preparing the novel polymers of this invention are well known in the art and are illustrated in such patents as U.S. Pat. Nos. 2,465,319; 3,018,272; 2,901,466; 3,075,952; 3,033,822; 3,033,826 and 3,033,827. These patents illustrate interchange reactions as well as polymerization or build-up processes. The alkali metal cation is then exchanged for a nitrogen based cation using such conventional methods as by molecular filtration or ultrafiltration at 25° C.

In such filtration methods, the polymer may be separated from salts using a membrane through which the liquid is allowed to pass by gravity or by the application of a pressure differential. Separation by the application of pressure is preferred. The pores of the membrane are small enough to retain the polymer, but large enough to allow the salts to pass through. Such methods are well known, and suitable equipment is commercially available, examples of which are referred to herein.

The following examples are submitted for a better understanding of the invention.

EXAMPLE 1—Water-Dispersible Polyester Containing 13 Mole Parts of 5-Morpholino-Sulfoisophthalate a. Preparation of Polymer Containing 13 Parts 5-Sodiosulfoisophthalate A 500-ml flask is charged with 86.7 g (0.522 mole) isophthalic acid, 23.1 g (0.078 mole) dimethyl-5-sodiosulfoisophthalate, 127.2 g (1.2 mole) diethylene glycol, and 100 ppm Ti as a catalyst based on weight of the polymer. The flask is equipped with a head having a nitrogen inlet, a take-off to remove volatile materials, and a socket joint to accommodate a stirrer. The stirrer shaft runs through the socket joint and has a ball joint attached by pressure tubing to the shaft to seal the socket joint.

The flask is swept with a slow stream of nitrogen, stirred, and immersed in a metal bath preheated to 200° C. Alcoholysis and esterification begins as soon as the contents of the flask are molten. The methanol and water evolved are swept by the nitrogen stream into a condensing system where they can be measured. Heating and stirring are continued for 75 minutes at 200° C. and then the temperature of the bath is increased to 240° C. When the bath temperature reaches 240° C., the reaction is held there for 30 minutes and then the bath temperature is increased to 275° C. At 275° C., the nitrogen inlet is closed and a vacuum pump is applied. Within 5 minutes, a pressure of less than 0.5 mm Hg is attained. Stirring and heating under reduced pressure are continued for 60 minutes. At the end of this time, the flask is removed from the bath and the polymer is recovered by breaking the flask. The inherent viscosity of the polymer is 0.61.

b. Exchange of the Sodium Ion of the Polymer for the Morpholino Ion

A laboratory scale unit of an Ultrafiltration System (Union Carbide) is used to exchange the sodium ion of the polymer for a nitrogen based cation. The tubes that are used are ARS type (Union Carbide).

In general, a 500-ml aqueous dispersion of 20% solids of the polyester containing the Na ion is treated with 1.0–3.0 moles of the nitrogen-based cation/mole of Na ion in 2–4 volume of water in the ultrafiltration system. The sodium ion is displaced from the polymer and eliminated by passing through the walls of the ARS filters in the permeater while the higher molecular weight polymer containing the morpholine salt stays behind in the retentate.

To 500 g of 20% solids aqueous dispersion of the polymer containing the sodium sulfonate group (0.041 mole Na ion, Part A) is added 1000 g of an aqueous solution of morpholino-hydrochloride, 0.103 mole. This mixture is pumped through the ultrafiltration system until 1000 g of permeate containing NaCl and excess morpholino-hydrochloride is collected. A portion of the retentate is evaporated to dryness and the resulting polymer has I.V.=0.61 and acid number=26 (Theory=27) compared to I.V.=0.61 and acid number$\leq$2.0 for the starting polymer.

EXAMPLE 2—Evaluation of Polyester Containing Various Ammonium Ions In Lieu of Na Ions as Coatings Polyesters made in Part A are treated with the aqueous solutions of the hydrochloride salts of ammonia (NH$_3$), dimethylethanolamine (DMEA), diethanolamine (DEOA), triethanolamine (TEOA), and pyridine (PYR) in order to replace the sodium ion on the sulfonate group.

Table 1 summarizes the results that are obtained from the determination of the effects of humidity at 120° F. on the blistering of coatings made from these polymers cured with Cymel 325, a melamine-formaldehyde resin. The polymers that contained ammonia, DMEA, DEOA, and TEOA salts have substantially higher resistance to humidity than the polymer that contained the sodium ion. In the case of pyridine, the coating system is unstable, i.e., a strong odor of pyridine is noted when the Cymel is added followed by precipitation of the polymer. The amines with ionization constants of $10^{-6}$ to $10^{-7}$ give coatings with the humidity resistance that is better than those with ionization constants of $10^{-5}$.

EXAMPLE 3—Evaluation of Primer Coatings Made from Polyesters Containing Amines with Ionization Constants of $10^{-6}$ to $10^{-9}$ Table 2 summarizes the results of exposing primer coats of the polyesters made as in per Example 1 to a humid environment at 140° F. The coatings contain polymer, Resimine 735, a melamine-formaldehyde resin, pigments, and water and are cured at 300° F. for 20 minutes on Bonderite 1000 steel panels. The coating made from the polymer containing the sodium ion dissolves under the test conditions after one hour while those containing DEOA and MORPH are unaffected. The coating made up with PYR in place of the sodium ion is unstable. After 17 hours of exposure to the humidity test conditions, dense blisters formed on the coatings containing amine sulfonate salts. After the coatings are allowed to dry at ambient conditions, they regain the appearance they had before being exposed to the humidity test condition.

In Table 2, Polyester A is a control identified as being derived from 87 mole % isophthalic acid, 13 mole % dimethyl 5-sodiosulfoisophthalate and 100 mole percent diethylene glycol. Polyesters B, C and D, according to this invention, are the same, except morpholinium, diethanolammonium and pyridinium hydrochlorides respectively are substituted for dimethyl 5-sodiosulfoisophthalate.

TABLE 1

| Typical Clear Enamel | | | Grams | | | |
| --- | --- | --- | --- | --- | --- | --- |
| Polyester of 87 mole % isophthalic acid | | | 40.0 | | | |
| 13 mole % 5-triethanolammonium sulfoisophthalic acid and 100 mole % diethylene glycol in a 16% solution in water, and | | | 1.6 | | | |
| Cymel 325 (80% in isopropanol)melamine | | | 41.6 | | | |
| Polyester/Melamine, Wt. Ratio | | | 80/20 | | | |
| Nonvolatives, Wt. % | | | 15.4 | | | |
| Appearance | | | Clear | | | |
| | Na | NH$_3$ | DMEA | DEOA | TEOA | PYR |
| Neutralizer[1] | | | | | | |
| Theoretical Polymer Hydroxyl Number from the Amine | 0 | 0 | 32 | 63 | 95 | |
| Amine Ionization Constant | — | $1.8 \times 10^{-5}$ | $1.3 \times 10^{-5}$ | $6.0 \times 10^{-6}$ | $3.1 \times 10^{-7}$ | $2.3 \times 10^{-9}$ |
| Film Properties[2] | | | | | | |
| Appearance | Clear | Clear | Clear | Yellow | Yellow | — |
| Humidity Resistance 3 hrs. at 120° F. Blistering Rating[3] | Loss of Adhesion | Dense #8,6,4 | Dense #8,6,4 | Dense #8 | None | — |
| Subjective Rating[4] | 0 | 3 | 4 | 7 | 10 | — |
| Solution Stability | 3 months | 3 months | 3 months | 3 months | 3 months | 1 hour - Pyridine odor |

[1]Neutralizer of Sulfonic Acid: Na = Sodium, NH = Ammonia, DMEA = Dimethylethanolamine, DEOA = Diethanolamine, TEOA = Triethanol Amine, PYR = Pyridine.
[2]Drawn Down and Cured 20 minutes at 300° F. on glass.
[3]ASTM D-714
[4]10 = Best, 0 = Worst

TABLE 2

| Resin Solutions | | | | |
|---|---|---|---|---|
| Polyester | A | B | C | D |
| Neutralizer | Na | Morpholine | Diethanolamine | Pyridine |
| Solids, Wt. % | 30.5 | 28.6 | 25.5 | 38.4 |

| Pigment Dispersion (Ball Mill) | GRAMS |
|---|---|
| Resimine 735, an amino crosslinking resin | 350 |
| Baryates, Foam A, a barium sulfate | 784 |
| Iron Oxide | 112 |
| TiO$_2$ | 112 |
| Strontium Chromate | 112 |
| Water | 400 |
|  | 1870 |

| | Parts by Weight (Grams) | | | |
|---|---|---|---|---|
| | Na | MORPH | DEOA | PYRD |
| Primer Formulations | | | | |
| Polyester A | 275.0 | — | — | — |
| Polyester B | — | 273.0 | — | — |
| Polyester C | — | — | 183.0 | — |
| Polyester D | — | — | — | 221.0 |
| Dimethylethanolamine | — | — | — | — |
| Pigment Dispersion (Above) | 137.5 | 130.1 | 77.8 | 141.4 |
| Water | | | | |
| | 4.2.5. | 403.1 | 260.8 | 362.6 |
| Polyester/Melamine | ← | ← | 8/2 | → |
| Pigment/Binder | ← | ← | 1/1 | → |
| Paint Stability | 24 Hours | 24 Hours | 24 Hours | 1 Min. |
| | Spray applied on CRS with Bonderite 1000 | | | |
| Properties | and Baked 20 minutes at 300° F. | | | |
| Humidity Resistance at 140° F. | | | | |
| 1 Hour | Coating Dissolved | No Effect | No Effect | — |
| 17 Hours, Blistering ASTM D 714 | — | Dense #8 | Dense #8 | — |
| Crosshatch Adhesion | Excellent | Excellent | Excellent | — |

The term "ionization constant" used herein is well known to those skilled in the art. It is the equilibrium constant for the reversible dissociation of a weak electrolyte as defined on page 1759 of Handbook of Chemistry (Large, Revised Tenth Edition) published by the McGraw-Hill Book Company. Ionization constants for many compounds are listed in the tables beginning on page 1209.

Other conventional additives which may be used include plasticizers, stabilizers, dyes, pigments, etc.

Unless otherwise indicated, all parts, percentages, ratios, etc., are by weight.

The invention has been described in detail with particular reference to preferred embodiments thereof, but it will be understood that variations and modifications can be effected within the spirit and scope of the invention.

I claim:

1. A linear, water-dissipatable polyester of
   (a) at least one dicarboxylic acid,
   (b) at least one glycol,
   (c) an amount sufficient to provide said water-dissipatible characteristic of said polymer of at least one polycarboxylic acid or polyhydric alcohol which contains a sulfonic acid salt moiety derived from a nitrogen-containing base having an ionization constant in water at 25° C. of $10^{-3}$ to $10^{-10}$, said polyester having an I.V. of at least 0.1 as measured in a 60/40 mixture of phenol-tetrachloroethane.

2. A linear, water-dissipatable polyester according to claim 1 wherein said polycarboxylic acid or polyhydric alcohol containing said sulfonic acid salt moiety is present in an amount of from about 5 to about 20 mole percent based on the total acid or glycol content.

3. A linear, water-dissipatable polyester according to claim 1 wherein said polycarboxylic acid or polyhydric alcohol containing said sulfonic acid salt moiety is present in an amount of from about 8 to about 15 mole percent based on the total acid or glycol content.

4. A linear, water-dissipatable polyester according to claim 1 wherein said dicarboxylic acid comprises isophthalic acid.

5. A linear, water-dissipatable polyester according to claim 1 wherein said glycol compresis a polyethylene glycol having a molecular weight of from about 100 to about 1000.

6. A linear, water-dissipatable polyester according to claim 5 wherein said glycol comprises diethylene glycol, triethylene glycol, or mixtures thereof.

7. A linear, water-dissipatable polyester according to claim 1 wherein said sulfonic acid salt moiety is attached to an aromatic nucleus.

8. A linear, water-dissipatable polyester according to claim 1 wherein said acid comprises isophthalic acid, said glycol comprises a polyethylene glycol and said sulfonic acid salt moiety is attached to an aromatic nucleus.

9. A linear, water-dissipatable polyester according to claim 1 wherein the ionization constant of said nitrogen-containing base is water at 25° C. is between $10^{-5}$ and $10^{-8}$.

10. A linear, water-dissipatable polyester according to claim 9 wherein said nitrogen-containing base is selected from ammonia, dimethylethanolamine, diethanolamine, triethanolamine, pyridine, morpholine and piperidine.

11. A linear, water-dissipatable polyester of (a) at least one dicarboxylic acid and at least one α,β unsaturated acid,
(b) at least one glycol,
(c) an amount sufficient to provide said water-dissipatible characteristic of said polymer of at least one polycarboxylic acid or polyhydric alcohol which contains a sulfonic acid salt moiety derived from a nitrogen-containing base having an ionization constant in water at 25° C. of $10^{-3}$ to $10^{-10}$, and
(d) from 0.1 to about 80 mole percent of at least one difunctional compound selected from a hydroxycarboxylic acid having one —CH$_2$OH group, an aminocarboxylic acid having one —NRH group, an amino-alcohol having one CR$_2$—CH group and one —NRH group, as diamine having two —NRH groups, wherein R is H or a 1-4 carbon alkyl group, said polyester having an I.V. of at least 0.1 as measured in a 60/40 mixture of phenol-tetrachloroethane.

12. An aqueous solution of the polyester defined in claim 1.
13. An aqueous solution of the polyester defined in claim 2.
14. An aqueous solution of the polyester defined in claim 3.
15. An aqueous solution of the polyester defined in claim 4.
16. An aqueous solution of the polyester defined in claim 5.
17. An aqueous solution of the polyester defined in claim 6.
18. An aqueous solution of the polyester defined in claim 7.
19. An aqueous solution of the polyester defined in claim 8.
20. An aqueous solution of the polyester defined in claim 9.
21. An aqueous solution of the polyester defined in claim 10.
22. An aqueous solution of the polyester defined in claim 11.

* * * * *